Aug. 17, 1943.    W. R. BOYLE    2,326,821
HYDRAULIC POWER TRANSMISSION SYSTEM
Filed March 26, 1942    3 Sheets-Sheet 2
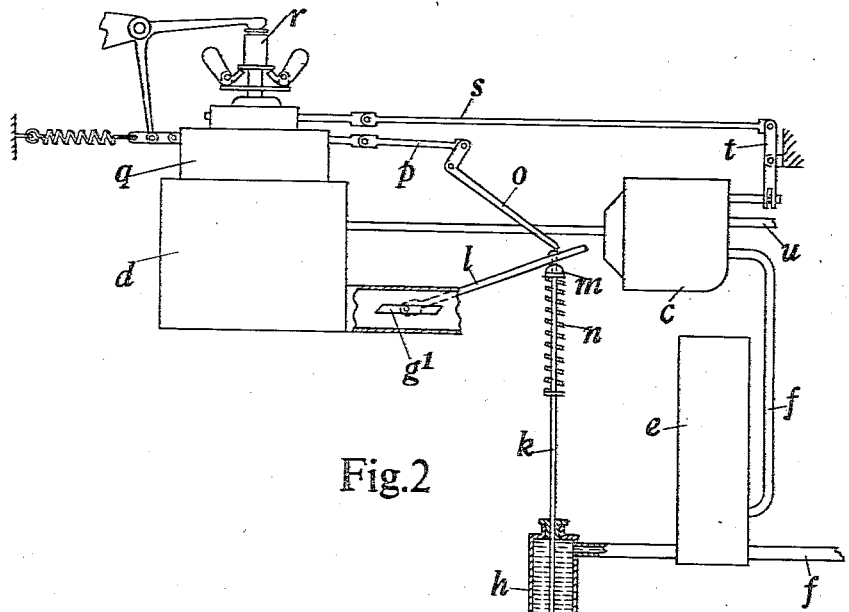
Fig.2
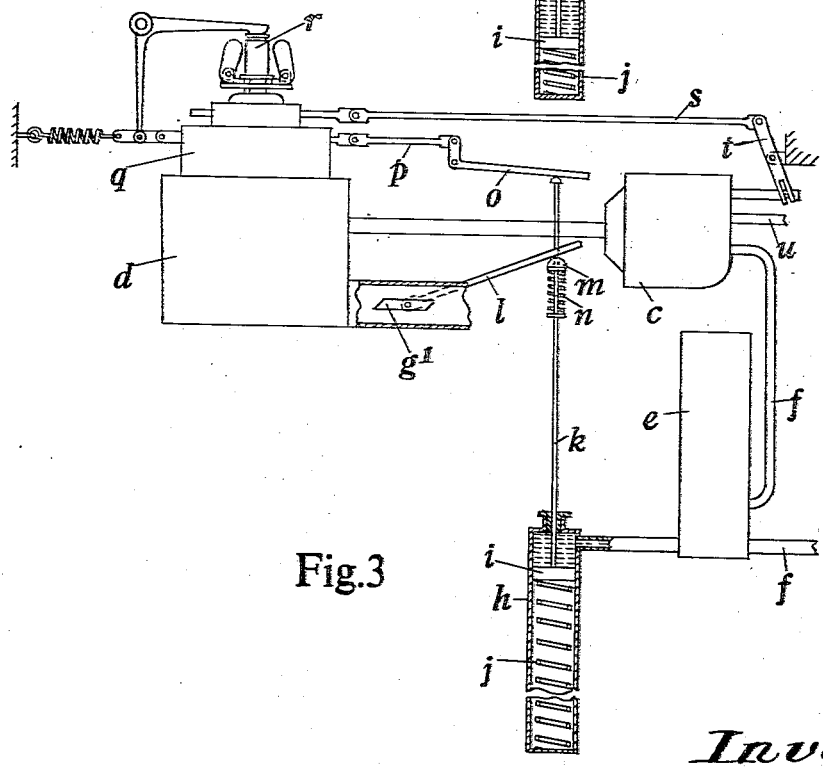
Fig.3

Aug. 17, 1943.   W. R. BOYLE   2,326,821
HYDRAULIC POWER TRANSMISSION SYSTEM
Filed March 26, 1942   3 Sheets-Sheet 3
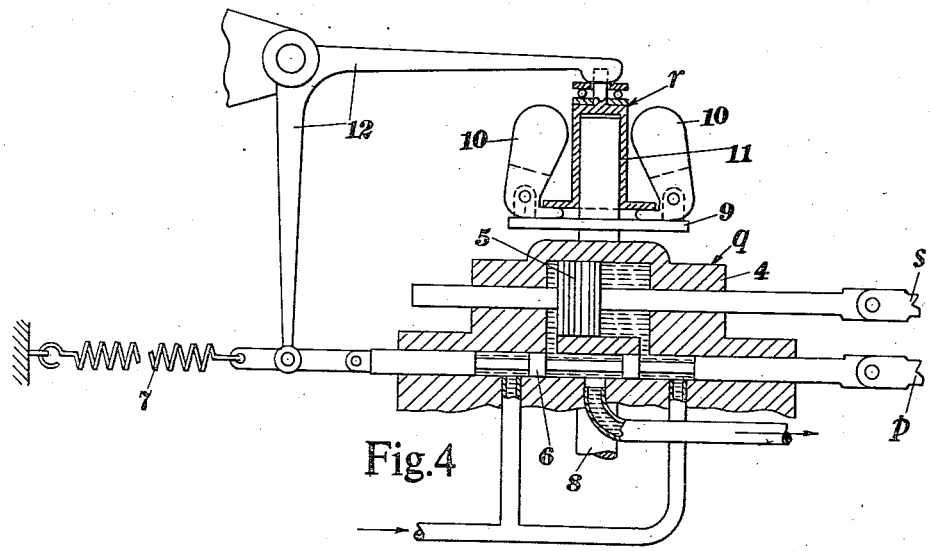
Fig.4
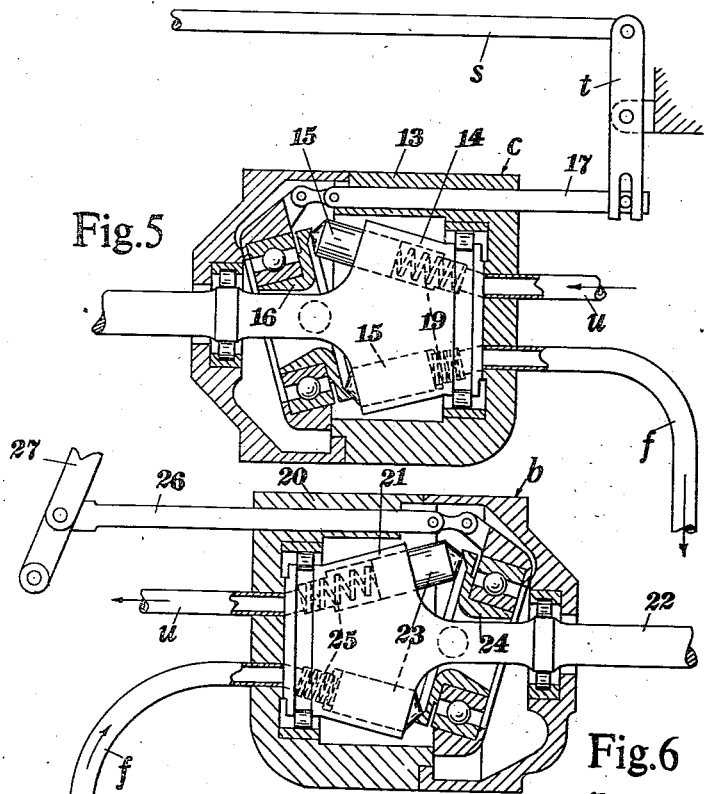
Fig.5
Fig.6
Inventor
W. R. Boyle
By Glascock Downing Seebold
Attys Patented Aug. 17, 1943

2,326,821

UNITED STATES PATENT OFFICE 2,326,821

HYDRAULIC POWER TRANSMISSION SYSTEM

William Robert Boyle, Finham, England, assignor of one-third to The Glacier Metal Company, Limited, Alperton, Middlesex, England, and one-third to The Rover Company Limited, Chesford Grange, near Kenilworth, Warwickshire, England Application March 26, 1942, Serial No. 436,353
In Great Britain April 16, 1941

2 Claims. (Cl. 66—19)

This invention relates to hydraulic power transmission systems and is particularly concerned with improvements in hydraulic systems for mechanically propelled vehicles of the kind in which a variable torque transmission is obtained by the combination of a hydraulic pump driven by the vehicle engine and a hydraulic motor driving the propelling mechanism of the vehicle, both the pump and motor being of the variable displacement type.

It is well known that the efficiency of an internal combustion engine operating at low powers is higher on full throttle and at low speeds than on part throttle and at high speeds. For example, when maintaining a high road speed on a slight down grade, under which conditions it is necessary to transmit to the road wheels only a low horse-power to maintain the speed, the greater part of the indicated horse-power developed by the engine is absorbed by rotating the engine at a relatively high speed which is unavoidable in the case of fixed ratio transmissions. If by substantially decreasing the gear ratio or mechanical advantage between the engine and the propelling mechanism under these conditions the engine speed could be correspondingly reduced, then the proportion of the horse-power developed by the engine which is absorbed by the engine itself would obviously be less, and not only would the consumption of fuel be reduced, but also wear and tear on the engine, and noise.

Transmission systems of the kind above-mentioned enable the engine to be operated under optimum conditions but, as the performance is controlled primarily by varying the torque ratio of the pump and motor, they are subject to an inherent defect rendering them unsuitable for practical use on vehicles. This defect is due to the lack of instantaneous and positive response to movement of the control pedal. A sudden increase in ratio by depression of the control pedal for acceleration will involve such speeding up of the engine that temporary deceleration takes place before acceleration. A sudden decrease in ratio, which automatically results from release of the control pedal, will cause temporary acceleration of the vehicle due to the energy of the rotating engine masses before deceleration can take place. This defect not only renders the response to the movement of the control pedal uncertain, but under certain conditions might prove dangerous.

The primary object of the present invention is to provide an improved hydraulic transmission system of the kind referred to in which the defect above-mentioned is obviated.

According to one feature of the present invention, an energy reservoir is arranged in communication with both the pump and the motor. This reservoir is adapted to contain a suitable volume of transmission fluid, such as oil, loaded by compressed air or other means. The function of the reservoir is to supply sufficient energy to accelerate the vehicle until the engine speed has risen proportionately and also to absorb energy from the engine when the torque ratio is suddenly reduced.

In the transmission system with which the invention is concerned the performance of the vehicle is controlled over a large part of the operating range by varying the torque ratio, and a substantially constant operating pressure in the system is obtained by automatic control of the engine and hydraulic pump.

More specifically the invention includes a hydraulic power transmission system comprising a pump driven by the engine, a motor driving the road wheels or other propelling means, both the pump and motor having a variable displacement and together giving a gradually variable transmission torque ratio (of, for example, from 20 to 1 to 1 to 1), an energy reservoir in the delivery line from the pump to the motor, a control pedal or like member for varying the displacement of the motor in accordance with requirements, and a device sensitive to conditions in the energy reservoir for controlling the engine throttle and, directly or indirectly, the displacement of the pump so as to maintain a substantially constant operating pressure in the hydraulic system. Up to full throttle the displacement of the pump is increased to a certain maximum under the control of a speed governor which limits the engine speed to a predetermined amount, for example, 500 revolutions per minute. If the power output of the engine is insufficient for requirements, the device which controls the throttle over-rides the action of the speed governor to reduce the displacement of the pump and thus allow the engine to speed up.

The invention is hereinafter described in more detail with reference to a particular embodiment which is illustrated by the accompanying diagrams.

Figures 2 and 3 show in different positions certain of the members included in the left-hand side of Figure 1.

Figure 4 illustrates diagrammatically a centrifugal governor and associated servo-mechanism.

Figure 1:
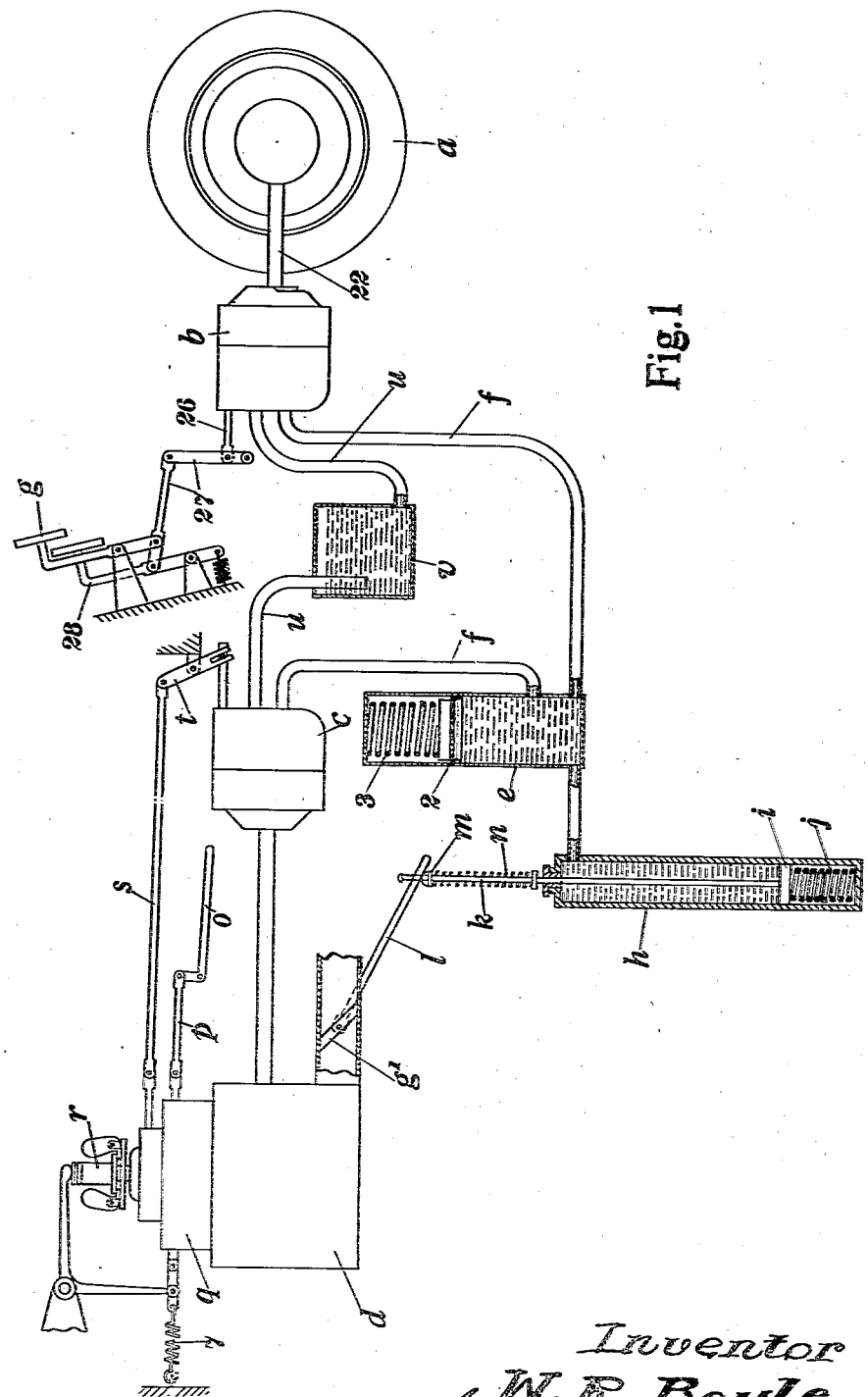
Figure 1 is a diagram illustrating the complete system as applied to a wheeled vehicle.

Figures 5 and 6 respectively illustrate in diagrammatic form a variable displacement pump and motor.

The driving road wheels on the vehicle (one of which is indicated by $a$) are coupled or geared to a variable displacement hydraulic motor $b$ the input end of which is connected through a pipe $f$ and an energy storing reservoir $e$ to the out-put end of a variable displacement hydraulic pump $c$ driven by the vehicle engine $d$, the energy storing reservoir being connected to the said pipe $f$.

In order to eliminate the conventional clutch, both hydraulic units $b$, $c$, have their displacement variable from zero to a maximum per revolution which, however, is not necessarily the same for both units. The control pedal $g$ varies the displacement of the hydraulic motor $b$ which is subject to substantially constant fluid pressure automatically maintained in the manner hereinafter described. Consequently, the driving torque will in most cases be substantially in direct proportion to the displacement. The power delivered by the motor will be proportional to the displacement and the speed, and the performance of the vehicle is therefore controlled entirely by variation of the displacement of the hydraulic motor. Increase of displacement is effected by movement of the upper end of the pedal to the left and decrease by the reverse movement. The effect of movement of the pedal is to operate the displacement control device of the motor which may be of any convenient and known kind, an example being described later with reference to Figure 6 of the drawings.

The pressure or displacement sensitive control device associated with the reservoir $e$ is connected to the engine throttle $g^1$ in such manner that up to full throttle the throttle is opened immediately a fall in pressure occurs in the reservoir, and as soon as the predetermined maximum pressure is restored the said device closes the throttle. In the example illustrated the control device associated with the energy reservoir $e$ comprises a hollow cylinder $h$ containing a piston $i$ loaded by spring $j$. The cylinder is connected to the energy reservoir $e$ at the side of the piston opposite to that acted on by the spring. The rod $k$ connected to the piston extends beyond the cylinder and is adapted to act on a lever $l$ connected to the throttle $g^1$. Actuation of the lever $l$ by the rod $k$ in one direction is effected through the medium of an abutment $m$ slidable on the rod and supported by a spring $n$ carried on the rod. Actuation of the lever $l$ in the opposite direction may be effected by the weight of the lever. The upper end of the rod is also adapted to act on a bell crank lever $o$ connected by a link $p$ to a servo mechanism $q$ which is also under the control of a centrifugal governor $r$ driven by the engine. The servo mechanism serves to vary the displacement of the pump through a link $s$ and lever $t$. One example of the servo mechanism and pump will be described later with reference to Figures 4 and 5.

The governor is arranged (by its action on the servo mechanism) to increase the displacement of the pump up to a maximum in accordance with increase in the engine speed so as to limit the speed to, for example, 500 revolutions per minute. This governor control is effective until the engine is on full throttle and the engine will not rise above 500 revolutions per minute as long as it is capable of developing, on full or part throttle, the power required to maintain the fluid pressure. If an increased fluid flow is required by the motor the control device over-rides the speed governor control and acts to reduce the displacement of the pump, thus allowing the engine to speed up and develop sufficient power to maintain the fluid pressure. Thus, it will be understood that the engine will operate between a very slow speed and, say, 500 revolutions per minute so long as the power required can be developed on full or part throttle between these engine speeds, but when further power is required the displacement of the pump is reduced sufficiently to allow the engine to speed up to the extent sufficient to develop the power required on full throttle. If the displacement of the motor is increased very suddenly the pressure in the reservoir $e$ may drop sufficiently to cause the control device to open the throttle fully and then take over the control of the displacement of the pump before the speed governor limiting the engine speed to 500 revolutions per minute at intermediate throttle openings can come into operation.

It will be understood that sudden changes in fluid flow to the motor will cause considerable energy to flow from or into the reservoir until the engine speed rises or falls to adjust the pressure conditions. The reservoir provides a reserve of energy for accelerating the vehicle while the engine is being speeded up to restore the normal transmission pressure and also accommodates the energy of the rotating engine masses when the transmission ratio is suddenly reduced as would be the case when the control pedal $g$ is released preparatory to slowing down the vehicle. With the control pedal released the displacement per revolution of the axle unit is zero, thus providing a free-wheel action.

The return line $u$ from the motor to the pump is preferably at atmospheric pressure and includes a reservoir, sump or reserve tank $v$ for accommodating momentary differences in the flow between the pump and motor.

It will be understood from the foregoing description that the displacement of the motor is varied by the control pedal, the displacement of the pump is varied by the speed governor subject to control by the control device when the engine is on full throttle, while the control of the throttle is effected by the control device. Control of the engine is entirely automatic in accordance with fluid flow requirements, the performance of the vehicle being controlled entirely by variation of the displacement of the motor associated with the road wheels or other propelling means of the vehicle.

It will be understood that the hydraulic pump and motor may be of any suitable type having a variable displacement per revolution and that the control device, the servo motor, and the speed governor may be of any suitable construction and connected for operation of the respective parts in any convenient manner.

Summarising the above description and with reference to the accompanying diagrams, Figure 1 shows the relative conditions of the various parts when the engine is idling at low speed. The motor $b$ is not drawing any fluid from the accumulator $e$ and therefore the pressure in the latter has risen sufficiently to depress the piston $i$ of the control device to its lowest position, causing the throttle valve to be in its closed position in which it allows only sufficient inflow of air to maintain the idling speed of the engine. Also the governor r has moved the pump displacement control to the position of zero displacement.

When the displacement control of the motor has been moved by the pedal g to a position in which the motor can draw sufficient fluid from the accumulator e, a pressure drop occurs in the latter allowing the piston i of the control device to move under the action of its spring j and thereby move the throttle valve $g^1$ to its fully open position as shown in Figure 2. As a consequence of the speeding up of the engine the governor r through the action of the servo device, moves the displacement control device of the pump in the direction for increasing the displacement and thereby controlling the engine speed to the lowest rate at which required torque can be smoothly generated. Also the bell crank lever o is moved over as shown.

When the motor draws more fluid from the accumulator than in the condition illustrated by Figure 2, a further fall of pressure occurs in the accumulator, and the piston i of the control device receives a further movement from its spring j causing the upper end of the rod k by its action on the bell crank lever o to override the governor while keeping the throttle valve $g^1$ fully open, this latter condition being permitted by compression of the spring n. The speed of the engine is therefore no longer controlled by the governor but by the action of the control device, causing the pump displacement to be appropriately reduced. This causes the engine to increase its speed and develop the required increased power.

To minimise risk of absorption of air from the upper end of the reservoir e by the oil, a piston 2 is arranged between the oil and the air, and this piston is loaded by a light spring 3.

Referring now to Figure 4, there is here shown one form of the servo mechanism q suitable for controlling the variable displacement pump. This comprises a cylinder 4 containing a piston 5 connected through the link s to the control lever of the pump. This piston is actuated by pressure fluid derived from any convenient source such as the lubricating system of the engine, and this fluid is controlled by a valve 6 operable in one direction by the governor r and in the other direction by a spring 7. The governor r (which is driven by the engine through a spindle 8) consists of a member 9 mounted on the spindle and carrying a pair of pivoted centrifugal masses 10 adapted to actuate a sleeve 11 slidably mounted on the upper end of the spindle, the sleeve being connected to the valve 6 by a bell crank lever 12. The valve is also connected by the link p (Figure 1) to the bell crank lever o so that it is operable both by the governor and the control device above described.

The pump c (which is exemplified in Figure 5) comprises a casing 13 in which is rotatably mounted a cylinder block 14 driven by the engine, this block having a plurality of bores in each of which is slidably arranged a plunger 15. Adjacent to the outer ends of the plungers is mounted a pivoted swash plate 16, the inclination of which can be varied by a rod 17 connected by the lever t to the control link s. Motion of the plungers in one direction is effected by the swash plate and in the other direction by springs 19. Fluid is supplied to the pump by the pipe u and conducted from the pump by the pipe f. Variation of the output of the pump is effected by variation of the inclination of the swash plate.

The motor b (which is exemplified in Figure 6) is similar to the pump. It comprises a casing 20 in which is rotatably mounted a cylinder block 21 connected to the driven shaft 22 which transmits motion to the road wheels a or other propelling means of the vehicle. In the cylinder block are a plurality of bores each containing a plunger 23, and at the outer ends of the plungers is arranged in the casing a pivoted swash plate 24. The plungers are moved in one direction by the swash plate and in the opposite direction by the springs 25. Fluid is supplied to the motor by the pipe f and returned to the sump v by the pipe u. Actuation of the swash plate is effected by the rod 26 which is connected to the pedal g by a link and lever mechanism 27 as shown in Figure 1. Variation of the inclination of the swash plate from the position of minimum to maximum displacement is effected by depression of the pedal g.

To obtain reverse rotation of the motor b the swash plate is arranged to be movable beyond its position of zero displacement, and this may be effected as shown in Figure 1 by the use of an additional pedal 28 which is also connected to the link and lever mechanism 27 in the manner shown. Actuation of the pedal g serves to vary the displacement of the motor when the motor is rotating in its normal direction. To reverse the direction of rotation of the motor the pedal 28 is depressed and this causes the swash plate to be moved beyond the position of zero displacement.

Whilst the invention has been described in the foregoing as applied to a vehicle fitted with road driving wheels, it will be understood that the invention is not limited to such a use as it may also be applied to vehicles fitted with endless tracks.

Having thus described my invention, what I claim as new and desire to secure by Letters Patent is:

1. A hydraulic power transmission system for a mechanically propelled vehicle, comprising the combination of a variable displacement hydraulic pump adapted to be driven by the vehicle engine, a variable displacement hydraulic motor adapted to be driven by the pump and to drive the propelling mechanism of the vehicle, an energy reservoir in communication with both the pump and motor, a control device responsive to the fluid pressure condition in the energy reservoir and adapted to control the throttle valve of the vehicle engine and the displacement of the pump, and a governor adapted to be driven by the vehicle engine and to control automatically the displacement of the pump.

2. A hydraulic power transmission system as claimed in claim 1 and having a servo motor whereby the displacement of the pump is variable under the control of the governor and the control device associated with the energy reservoir.

WILLIAM ROBERT BOYLE.